Aug. 21, 1934.  E. J. CROSSEN  1,970,842
BELT CONVEYER
Filed Aug. 22, 1932  5 Sheets-Sheet 1

INVENTOR
ELMER J. CROSSEN
BY
ATTORNEY

Aug. 21, 1934.  E. J. CROSSEN  1,970,842
BELT CONVEYER
Filed Aug. 22, 1932  5 Sheets-Sheet 2

INVENTOR
ELMER J. CROSSEN
BY John E. Hubbell
ATTORNEY

Aug. 21, 1934.  E. J. CROSSEN  1,970,842
BELT CONVEYER
Filed Aug. 22, 1932   5 Sheets-Sheet 3

INVENTOR
ELMER J CROSSEN
BY John E. Hubbell
ATTORNEY

Aug. 21, 1934.  E. J. CROSSEN  1,970,842
BELT CONVEYER
Filed Aug. 22, 1932  5 Sheets-Sheet 4

INVENTOR
ELMER J. CROSSEN
BY John E. Hubbell
ATTORNEY

Aug. 21, 1934.  E. J. CROSSEN  1,970,842
BELT CONVEYER
Filed Aug. 22, 1932   5 Sheets-Sheet 5

INVENTOR
ELMER J CROSSEN
BY John E. Hubbell
ATTORNEY

Patented Aug. 21, 1934

1,970,842

UNITED STATES PATENT OFFICE 1,970,842

BELT CONVEYER

Elmer J. Crossen, East Orange, N. J.

Application August 22, 1932, Serial No. 629,764

17 Claims. (Cl. 198—191)

My present invention consists in improved material conveying apparatus of the belt conveyer type, devised with the general object in view of avoiding certain objections to, and of obtaining certain practically important advantages over, the belt conveyer type of apparatus now in general use for such purposes as the transportation of coal, coke, ore, broken stone and other materials in substantial quantities and for substantial distances.

The typical belt conveyer apparatus now in general use for the purposes specified consists essentially of a conveyer belt, belt driving and guiding pulleys, tension regulating means and other accessories. While lighter belts are employed in some cases, for ordinary service in transporting heavy materials as coal, coke, ore and broken stone, the conveyer belt has usually been from two and one-half to four feet wide and from about one-half to three-quarters of an inch thick, and has been composed of some five to ten plies of rubber impregnated cotton fabric encased in a cover of rubber vulcanized on the fabric. For convenience of designation, I shall hereinafter customarily designate the conveyer belt now and previously in extensive use and which I have just described as an ordinary conveyer belt. The latter, in regular use, serves both as a moving platform which supports and transports the material handled, and as the power transmission means which transmits the force by which the belt, with the material which it supports, is given its movement or travel.

In an ordinary conveyer belt the transmission force and the resultant belt tension are substantial. Owing to the considerable weight of the belt itself and of its load, the frictional resistance to the movement of a belt of the considerable normal length, such belts being occasionally as long as 1500 feet or so, is substantial, and would be so even though the friction due to the belt flexure could be disregarded. That friction cannot be disregarded, however, as it is necessarily large in the case of a wide, thick belt, which must bend as it passes about various guiding and driving pulleys including the so-called troughing pulleys ordinarily employed to minimize spillage by giving a trough shape to the portion or section of the belt on which the material being transported is carried.

The substantial tension in an ordinary conveyer belt serving both as a carrier belt and as a power transmitting belt is borne almost entirely by the cotton fabric carcass of the belt. Dust, moisture and fumes work into and rapidly weaken the cotton fabric on local failures of the rubber casing of the belt, such as constantly tend to occur, not only from ordinary wear but also from burns in transporting hot coke or other heated material and from cuts or localized abrasions due to impact of heavy lumps when the material handled includes such lumps, or as a result of the tendency of the belt splicing connections to pull away from the belt material. As soon as an ordinary conveyer belt shows signs of appreciable surface injury, the belt, or at least the injured section thereof, should be and ordinarily is replaced to avoid risk of the actual rupture of the belt in service as such rupture may do much damage to property and endangers the lives of the operators.

A belt conveyer constructed in accordance with the present invention comprises separate carrier and transmission belts. My carrier belt may be generally similar to the conveyer belts now in use, but as the tension to which it is subjected may be so slight as to be practically insignificant, my carrier belt, for a given material handling duty, may be substantially thinner, lighter and less expensive to construct than an ordinary conveyer belt.

The transmission belt of my improved belt conveyer comprises a plurality of narrow individual belt elements having side by side upper and lower run portions respectively underlying and supporting substantially all or much at least of the upper and lower runs of the carrier belt. To permit the upper and lower transmission belt runs to underlie the corresponding runs of the carrier belt, I laterally displace the end portions of the individual transmission belt elements from the adjacent portions of the carrier belt, the narrow form of said element providing the flexibility required for such displacement.

My narrow transmission belt elements may be of various forms and various materials. For example, they may be made of hemp ropes in some cases. In general, however, they will consist of wire cables, and for ordinary heavy duty service may well be made of Monel metal, or of alloy steels especially suitable for particular conditions of use.

Whatever the form and material may be, the aggregate tensile strength of my narrow transmission belt elements may readily be, and ordinarily should be, substantially greater than the tensile strength which it is practically possible to give an ordinary conveyer belt of the same material handling capacity. The maximum tensile strength of an ordinary conveyer belt is relatively low, as the thickness of the cotton fabric carcass of the belt must be kept small to avoid undue belt stiffness. An increase in belt stiffness increases the power required to bend the belt about the conveyer pulleys, and correspondingly increases the belt tension. Undue belt stiffness and undue belt tension each have an objectionable tendency to prevent proper troughing of the conveyer belt.

The relatively great tensile strength which my transmission belt may have makes it possible to make the aggregate belt tension substantially higher than is practically possible with an ordinary conveyer belt without reduction in the safety factor. This permits of a conveyer belt length greater than has been practically possible heretofore, and makes possible other advantages.

Increased belt tension is particularly important because, generally speaking, the higher the belt tension, the smaller the tendency of the belt to sag between supports. With the ordinary conveyer belt it has been found necessary to provide guiding or idler pulleys at very short intervals under the load-carrying portion of the path of the belt. In common practice, particularly where the belt is troughed as it is in most cases, the idler pulleys under the load-carrying portion of the path of an ordinary conveyer belt are located at intervals of about three and one-half or four feet. Even with such close spacing of the idler pulleys, difficulty arises from the tendency of the ordinary conveyer belt to sag between adjacent sets of idler pulleys, as it is not practically possible to put the belt under sufficient tension to prevent a substantial amount of sagging. The sagging between idler pulleys of the load-carrying portion of an ordinary conveyer belt is objectionable for various reasons. Such sagging tends to produce movement of the material transported relative to the belt as the latter rises and falls in passing over each set of idler pulleys. When the material is in the form of heavy lumps of coke, coal, ore or other heavy lumpy material, the movements of the lumps on the belt subject the latter to local abrasions and cutting actions, weakening and shortening the effective life of the belt.

This tendency to objectionable movement of lumpy material relative to the belt is augmented by the tendency of an ordinary conveyer belt which is troughed, to flatten out between idler pulleys. Furthermore, the sagging tendency not only increases the power required to drive the belt, but subjects the idler rolls to highly objectionable impact forces when the material handled is heavy and lumpy. Such impact forces increase the tendency of the material to injure the belt and are great enough to subject the idler pulleys and their supports to injury. Occasionally those impact forces break the idler rolls or their supporting framework. Owing to the stiffness of the ordinary conveyer belt and the manner of its support by the troughing rolls which stretches the edges of the belt as it passes over them, the tendency of the belt to flatten out between the idler rolls, with consequent spillage of the material handled, is a matter of importance.

While the idler pulleys under the lower return run of an ordinary conveyer belt may be, and ordinarily are, spaced about twice as far apart as are the roller pulleys beneath the loaded portion of the belt, the possible distance between the idler rollers is comparatively short and the number of idler pulleys is correspondingly great in all cases. An important practical advantage of the invention is that it permits the idler pulleys for the transmission belt to be spaced much more widely apart than is customary or necessary in the case of the ordinary conveyer belt. In practice I contemplate an idler belt separation about twice as great as is customary. Since in the case of an ordinary conveyer belt of the moderate width of three feet, the installation cost of the idler pulleys is of the general order of, and ordinarily exceeds, ten dollars per foot of belt length, the substantially smaller number of sets of idler pulleys required with my invention thus permits of a very substantial reduction in the installation cost of a belt conveyer apparatus of ordinary capacity. Furthermore, the idler belt pulleys required with my invention may well be inherently less expensive to construct, because they may be made lighter, and with less machining, than the idler pulleys required for the ordinary conveyer belt.

The fact that with my invention, the carrier belt may be substantially lighter, and hence less expensive to construct, than an ordinary conveyer belt of the same transporting capacity, also reduces the cost of installation. Furthermore, in many cases in which my apparatus may replace or be added to a previously existing installation of ordinary type, a substantial further saving is possible, because ordinary conveyer belts too worn to permit of their further use as ordinary conveyer belts, may still be used for long periods in the carrier belt element of my apparatus.

The greater separation between idler pulleys permitted with my invention is due partly to the high transmission belt tension possible, and partly to the fact that with my apparatus an increase in the distance between adjacent sets of troughing rolls, and corresponding belt sagging, does not result in a corresponding tendency of the carrier belt to flatten out between the idler pulleys, since my transmission belt elements form a cradle-like support for the carrier belt which tends to maintain the troughing of the latter regardless of the amount of sag between troughing rolls permitted.

In addition to the general features of novelty and advantage to which reference has already been made, my improved apparatus is characterized by various special features of construction and advantages hereinafter referred to, or inherent in features of construction hereinafter described.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described preferred embodiments of the invention.

Of the drawings:

Fig. 1 is a somewhat diagrammatic elevation of the left-hand portion.

Fig. 2 is a plan view, and Fig. 3 is an elevation of an end portion of the apparatus shown in Figs. 1 and 1a;

Fig. 11 is a diagrammatic plan view with parts broken away, and Fig. 12 is a side elevation of a conveyer installation differing in form from that shown in Figs. 1 and 1a.

Figure 1:
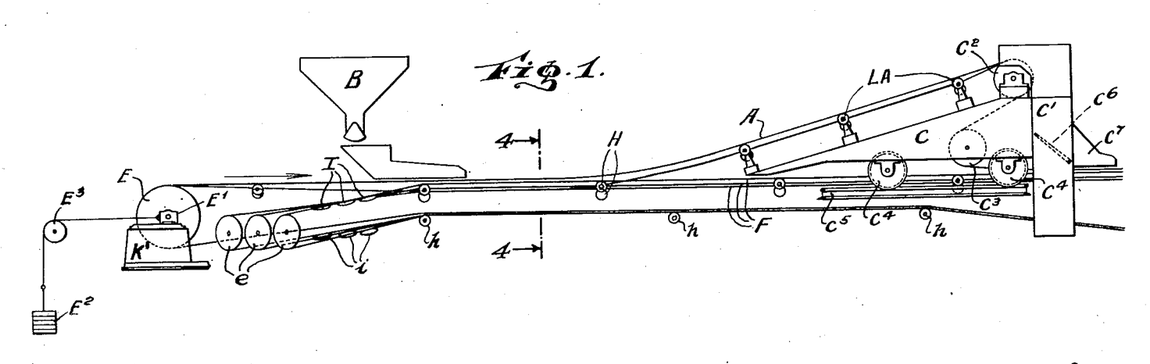
Figure 1A:
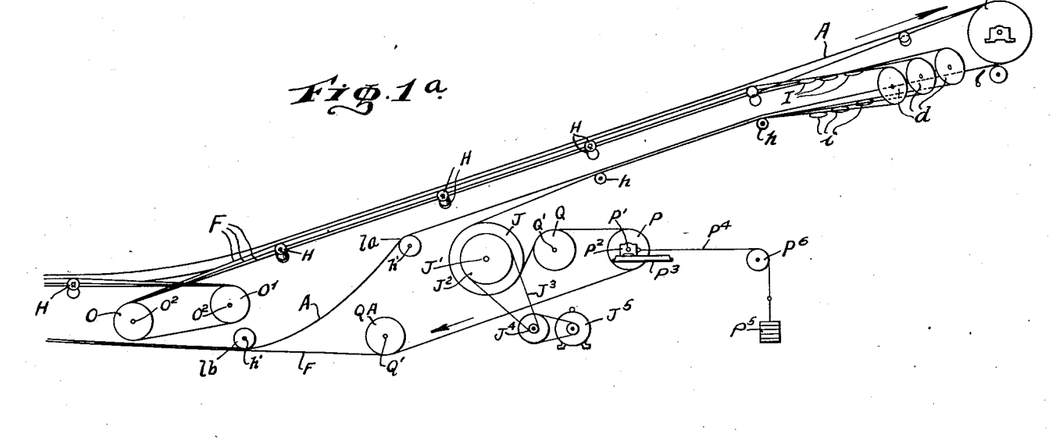
Fig. 1a is a similar representation of the right-hand portion of a belt conveyer installation.

In Figs. 1 and 1a I have illustrated somewhat diagrammatically a typical embodiment of the present invention in a belt conveyer installation comprising a carrier belt A receiving material to be transported from a hopper or chute B and discharging it either into the discharge trough C' of a so-called tripper C located intermediate the ends of the belt, or, when the tripper is rendered imperative, at the head end of the belt, as the carrier belt turns about the head pulley D. At its opposite end the carrier belt A turns about a tail pulley E. The head and tail pulleys D and E may be similar in construction to those employed with ordinary conveyer belts, but need not be as strongly made owing to the relatively low carrier belt tension required with my invention. As shown in Fig. 1 the supporting bearings E' for the pulley E are slidingly mounted for horizontal movement in the general longitudinal direction of the belt on a guideway formed by the upper ends of pedestals K'. The pulley E is adjusted on the pedestals K' as required to hold the belt sufficiently taut at all times while accommodating the expansion and contraction of the belt as a result of changes in atmospheric or other conditions, by weight means $E^2$ cable connected to the bearings E' of the pulley E, and depending from a cable guide pulley $E^3$.

The carrier belt A is supported and given its motion by a transmission belt consisting, as shown, of six transmission belt elements F each in the form of a cable and looped at its head end about a corresponding grooved end pulley or sheave d, and at its opposite end about a similar tail pulley e. Between its ends each belt element F is supported and guided by other pulleys which comprise main upper idler pulleys H and lower idler pulleys h, special upper and lower guide pulleys I and i adjacent each end of the belt and certain other pulleys including drive pulleys J, all as is hereinafter described.

Figure 4:
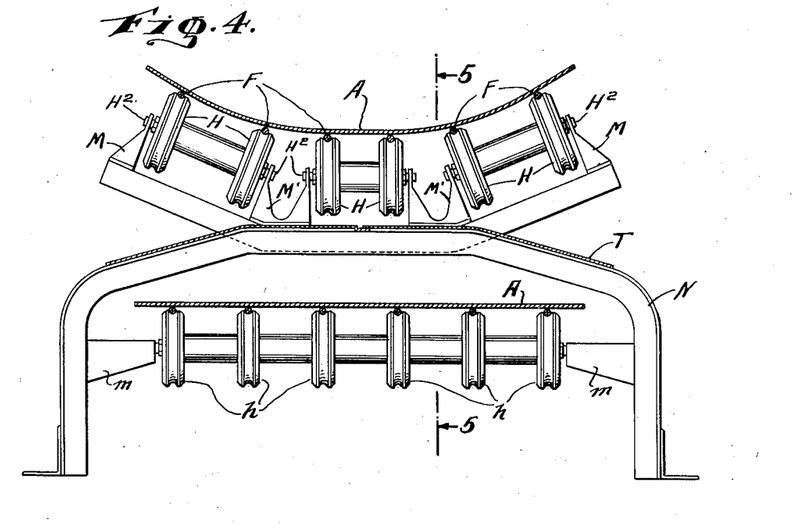
Fig. 4 is a transverse section on the line 4—4 of Fig. 4.

The main guide pulleys H and h are located directly below the upper and lower runs, respectively, of the carrier belt, and, as shown best in Fig. 4, are so disposed that the latter is engaged and supported adjacent its outer edge by the corresponding portions of the two outer transmission belt elements F. The four intermediate belt elements F are suitably spaced apart between the two side elements. As shown, the main portions of the intermediate belt elements are similarly spaced apart, with the distance between adjacent intermediate elements slightly less than the distance between each side element and the adjacent intermediate element.

Figure 2:
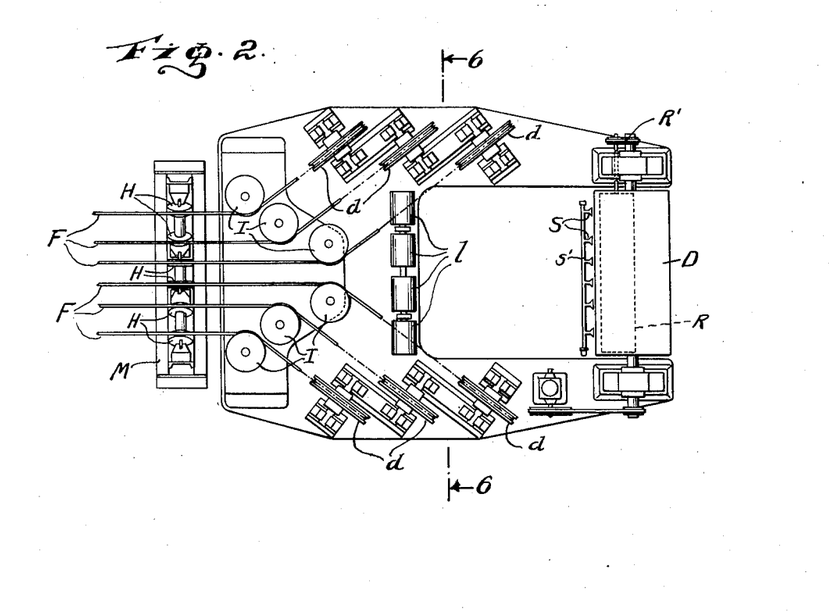

The location of the lower run of the carrier belt for the major portion of its length below the upper run and above the lower run of the transmission belt is permitted by the displacement of the ends of the transmission belt elements laterally of the carrier belt. As shown in Fig. 2, the three head pulleys d for the transmission belt elements at one side of the longitudinal center of the conveyer are displaced to one side, and the other three pulleys d are displaced to the opposite side of the carrier belt.

Figure 3:
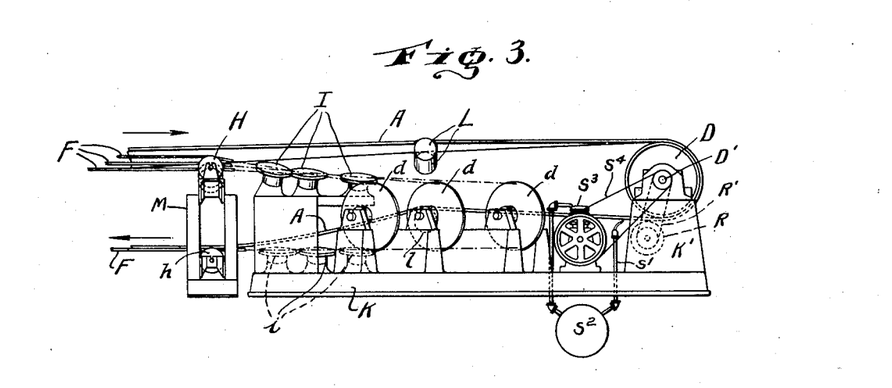

Advantageously and as shown in Figs. 2 and 3, the pulleys d, and the adjacent pulleys I and i are all mounted on a common supporting frame K which also carries the pedestals K' supporting the bearings D' for the carrier belt head pulley D. While the planes of all the pulleys d may all be vertical, the planes of the pulleys d at opposite sides of the carrier belt are oppositely inclined to a vertical plane extending longitudinally of the conveyer. The various guide pulleys I and i should be disposed, as those skilled in the art will understand, to properly guide the upper and lower runs of the corresponding belt elements, each between its pulleys d and the corresponding adjacent main idler pulleys H and h. To this end, in the arrangement shown best in Figs. 2 and 3, the pulleys I and i are inclined so slightly to the horizontal that in plan view those pulleys appear to be practically horizontal.

The pulley e, I and i at the tail end of the conveyer may be mounted on a supporting frame exactly like the frame K shown in Figs. 2 and 3, except that its pedestals K' should be shaped to provide the previously mentioned guideways for the sliding bearings E' of the tail pulley E.

As shown, the frame K supports one set of upper idler pulleys L, and one set of lower idler pulleys l for the carrier belt A, engaging and supporting the latter between the head pulley D and the positions along the length of the carrier belt, at which the upper and lower runs of the latter come into supporting engagement with the upper and lower runs of the transmission belt elements F. At the opposite end of the carrier a set of upper idler pulleys L and a set of lower idler pulleys l are similarly provided to engage and support the carrier belt between the tail pulley E and the positions along the length of the carrier belt at which its upper and lower run portions come into engagement with the underlying portions of the transmission belt elements F.

Figure 7:
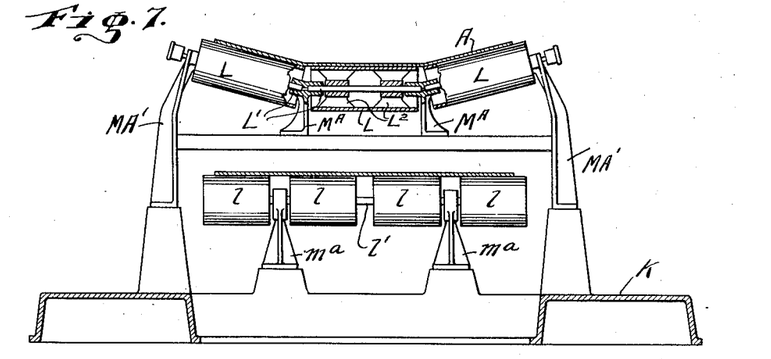
Fig. 7 is a section on the line 6—6 of Fig. 2 with one of the carrier belt troughing pulleys shown in section.

The idler pulleys L and l may be, and are shown as of standard type customarily employed heretofore to engage the upper and lower runs respectively of an ordinary conveyer belt. As shown, the idler pulleys L are troughing pulleys, the middle pulley having its axis horizontal while the side pulleys have their axes inclined to the horizontal in accordance with the desired troughing contour of the carrier belt. As shown in Fig. 7, there are two side pulleys L as is common practice, although it is also common to employ two idler troughing pulleys at each side of a center pulley for an ordinary conveyer belt of substantial width.

In the particular type of standard idler pulley construction shown in Fig. 7, each of the rolls L comprises a cylindrical body member and hub portions $L^2$ secured to the body member and by which the latter is journalled on the normally stationary pulley shaft L'. The outer end of the shaft L' of each side pulley L is journalled in a corresponding side bracket MA', and the inner end of each side pulley shaft L' and the adjacent end of the center pulley shaft L' are journalled in a corresponding intermediate bracket MA, the brackets MA, MA' being supported, as shown in Fig. 7, by the frame K. In the arrangement shown in Fig. 7 there are four idler pulleys $l$ in each set, all mounted on a common supporting shaft $l'$ which is journalled in brackets $ma$ carried by the frame K.

The idler pulleys H and $h$ required for the transmission belt elements F need differ from the ordinary belt conveyer idler pulleys such as the pulleys L and $l$, only in that each pulley H and $h$ is a grooved pulley, and hence may, and ordinarily will be, narrower or shorter than are the pulleys L and $l$. Thus, for example, in rebuilding existing conveyer installations, the transmission belt pulleys required for the use of my invention may be formed, as illustrated in Fig. 8, by shrinking or welding two or more grooved pulley elements HA on a single pulley L of the type shown in Fig. 7, or, alternatively, they may be formed by replacing the body and hub portions $L^2$ of each pulley L by narrow grooved pulleys HB, as shown in Fig. 9.

Figure 5:
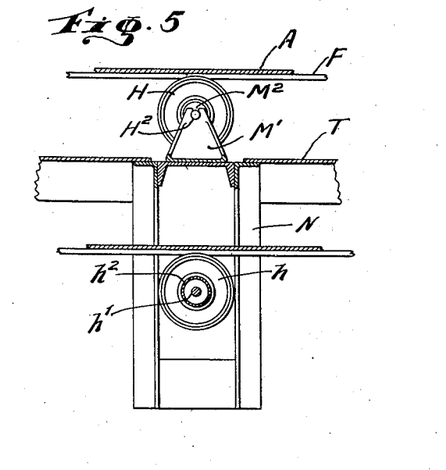
Fig. 5 is a partial section on the line 5—5 of Fig. 4.
Figure 6:
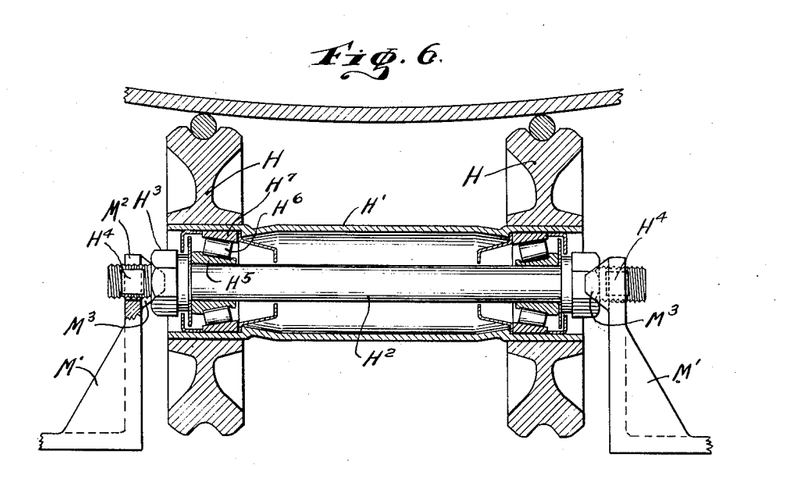
Fig. 6 is a sectional elevation of a preferred transmission belt troughing pulley construction.
Figure 8:
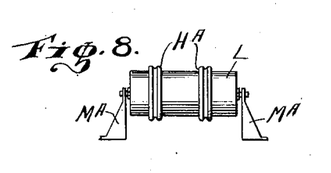
Figs. 8 and 9 each illustrate a different belt troughing pulley modification.
Figure 9:
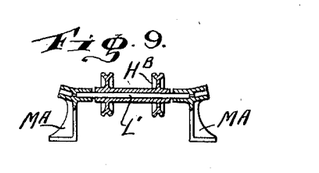

An idler pulley arrangement for the transmission belt elements which I regard as ordinarily preferable for new constructions to the arrangements shown in Figs. 8 and 9, is illustrated in detail in Figs. 4, 5 and 6. In the construction shown in Figs. 4, 5 and 6, the six troughing pulleys H of each set are connected in pairs to form three troughing pulley units, each of which comprises two pulleys H shrunk on or otherwise secured to the ends of a common sleeve H'. The sleeve and pulley members of each pulley unit are shown as supported on a non-rotatable shaft unit $H^2$ supported in brackets carried by a supporting framework K, the outer ends of the shafts $H^2$ of each side pulley unit being supported by an individual bracket member M, and the inner ends of the shaft $H^2$ of each side pulley unit and the adjacent end of the shaft $H^2$ of the center pulley unit being supported one in one branch or arm and the other in the second branch or arm of a double bracket M'.

As shown, a roller bearing is interposed between each end of the sleeve member H' of each pulley unit, and the corresponding end of its supporting shaft $H^2$. Each roller bearing in the form shown, comprises an inner stationary track member $H^5$ carried by the shaft $H^2$, a set of rollers $H^6$, and an outer track member $H^7$ secured to and turning with the corresponding end of the sleeve member H'. To permit adjustment for wear, the ends of each shaft $H^2$ are threaded and provided with threaded take-up means including a lock nut $H^3$ at each end of each shaft which is held from rotation by brackets lugs $M^3$. Advantageously and as shown, the sides of each threaded end of each shaft $H^2$ are flattened at $H^4$ for engagement with the corresponding side wall of a bearing slot $M^2$ formed in the upper end of the corresponding bracket M' or M, the slots $M^2$ being open at their upper ends to permit the pulley elements to be readily put into place and removed when this is necessary for inspection, adjustment or repair purposes.

The roller bearings illustrated and described are of standard type, and such bearings have heretofore been used in idler pulleys for ordinary conveyer belts to reduce friction and wear and to avoid the necessity for the frequent use of grease guns or the other lubricating provisions ordinarily required with the simpler form of bearings illustrated in Figs. 7 and 9. As those skilled in the art will understand, the type of pulley construction illustrated in Fig. 6 is relatively inexpensive, notwithstanding its inclusion of roller bearings, and is inherently less expensive than a pulley including an elongated body member of the type shown in Fig. 7 when the latter is provided with roller bearings of the character shown in Fig. 6.

In the form shown best in Figs. 4 and 5, each set of transmission belt idler pulleys $h$ is supported by a common stationary supporting shaft $h'$, secured at its ends in brackets $m$ carried by the corresponding supporting structure N. The adjacent pulleys $h$ of each set are shown suitably spaced apart on and secured to a tubular shaft or sleeve $h^2$ journalled on the shaft $h'$. With the described construction each transmission belt element F is supported and guided by a set of pulleys individual to that belt element and the latter may be grooved and disposed to properly fix the path of travel of all portions of the corresponding narrow belt element, and, in particular, to maintain the desired spacing laterally of the carrier belt of the upper and lower run portions of the transmission belt elements F in supporting and frictional driving engagement with the corresponding upper and lower run portions of the carrier belt. To properly trough and support a load carrying run portion of the carrier belt, the different elements F underlying the central portion of the carrier belt may be spaced more closely together than the elements adjacent the side edges of the carrier belt. Thus, as shown in Fig. 4, in the upper troughed load carrying portion of the conveyer the lateral distance between each outside element F and the adjacent element is greater than the distance between the two elements F nearest the longitudinal center line of the conveyer, and is greater than the lateral distance between each of the two last mentioned elements F and the element F adjacent thereto, but nearer the corresponding side edge of the conveyer. The pulleys $h$ spacing the elements F underlying an untroughed portion of the carrier belt carrying no load may be uniformly spaced as shown in Fig. 4. Aside from other considerations there is an especial advantage in having the lateral spacing of the upper run portions of the elements F different from the lateral spacing of the underrun portions of those elements, in that the wear on the carrier belt due to the engagement of the latter with the transmission belt elements F is confined to longitudinal portions of the inner side of the carrier belt engaged by upper run portions of the elements F which are different from the longitudinal portions of the outer side of the carrier belt engaged by the underrun portions of the elements F.

In many belt conveyer installations it is common to incline different portions of the load-carrying run of the conveyer at different angles to the horizontal. For example, it is frequently desirable to provide an initial horizontal run portion followed by a final inclined load-elevating portion, as shown collectively in Figs. 1 and 1a. In such a case, the use of the present invention is highly advantageous because it permits the two portions of the load-carrying run, which are definitely inclined at different angles to the horizontal, to be connected by a shorter intermediate portion than is possible with an ordinary conveyer belt. The intermediate portion or section of the conveyer belt referred to is the curved section between the two right-hand sets of idler pulleys H shown in Fig. 1a. With the substantial tension to which an ordinary conveyer belt is subjected, said intermediate section must be of substantial length and is ordinarily supported by several sets of idler pulleys arranged along the catenary arc which the carrier belt tends to assume. As the tension on the belt increases, the radius of the arc of this section must increase. In practice the minimum radius is approximately 200 feet. With the relatively very small carrier belt tension required with the present invention, however, the resultant freedom of the carrier belt to sag permits the length of said intermediate section to be made quite short, and a comparatively small fraction only of the length of the intermediate section required with an ordinary conveyer belt. The maximum radius of curvature of such an intermediate section of my carrier belt need not exceed 10 feet.

The relatively high tension of the transmission belt elements F imposes no significant limitation on the length of the intermediate section of the above mentioned conveyer, since the run portions at different angles to the horizontal of the transmission belt elements may be brought as close together as may be desirable by the use of various guide pulley arrangements. Indeed said transmission belt run portions may well be made to intersect by the simple expedient of looping the corresponding portions of the transmission belt elements about two sets of suitably placed idler pulleys O and O', as shown in Fig. 1a. The set of idler pulleys O and the set of idler pulleys O' may be each similar in construction and mounting to the idler pulleys $h$ previously described, except that to diminish the stress impressed upon the belt elements in bending them about the pulleys O and O', the latter are ordinarily and advantageously made substantially larger in diameter than the pulleys $h$.

In a belt having horizontal and inclined load-carrying run portions as shown in Fig. 1a, the shortening of the above mentioned intermediate section of the conveyer portion ordinarily reduces the required length of the portion of the conveyer at the delivery end of the horizontal load-carrying portion of the conveyer. This results from the fact that the inclined portion of the conveyer is ordinarily provided for the purpose of elevating the material handled to a given height above the level of the horizontal load-carrying portion of the conveyer, and from the further fact that the angle of inclination to the horizontal of the inclined portion of the conveyer is ordinarily dependent on the angle of stability or repose of the material handled, and is made as steep as is possible without risk of the material sliding or working downward along the inclined portion of the conveyer. As those skilled in the art will readily understand, therefore, for a given elevating effect, a reduction in the length of said intermediate conveyer section shortens the required distance between the head pulley (D) and the horizontal section of the conveyer.

With the driving force impressed on the transmission belt elements, and the latter in the form of cables, it is practical to impress the driving force at any convenient point along either the upper or lower runs of the transmission belt. For example, the conveyer shown in Figs. 1 and 1a may obviously be driven by applying torque either to the shaft $O^2$ carrying the pulleys O, or to the shaft $O^2$ carrying the pulleys O'. As shown in Fig. 1a, however, the transmission belt elements F are advantageously driven by a special set of driving pulleys J of suitable diameter carried by a shaft J' which also carries a driving pulley $J^2$. The latter is engaged and driven by a driving belt $J^3$ given motion through suitable speed reducing pulleys $J^4$ by a driving motor $J^5$. As shown in Fig. 1a, a set of pulleys Q mounted on a common shaft Q' and interposed between the driving and tension pulleys J and P, serve to increase the angle of contact between the belt elements F and the driving pulleys J.

Figure 11:
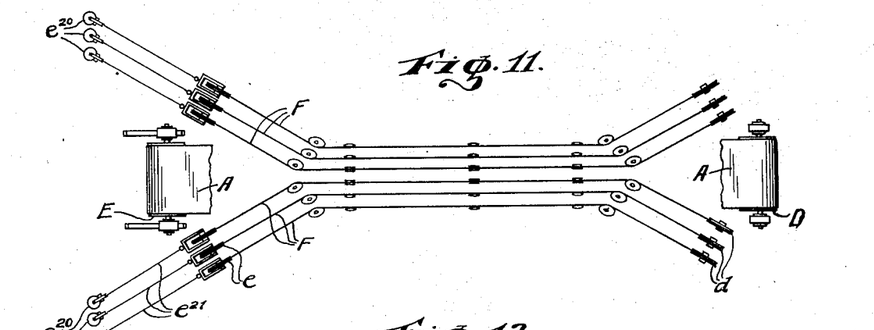

As shown in Fig. 1a, the transmission belt elements F are held under suitable tension by tension means shown as comprising a set of tension pulleys P, each pulley having an individual shaft P' which is mounted at each end in a bearing $P^2$ slidably mounted on a guideway $P^3$. The bearings $P^2$ for each pulley are connected by a cable or flexible element $P^4$ to a tension weight $P^5$ depending from a guide pulley $P^6$ about which the element $P^4$ extends. This arrangement, which is essentially the same in principle as that illustrated in Figs. 11 and 12, hereinafter described, provides a separate and automatic take-up for each transmission element F. A set of idler pulleys QA carried by a common shaft Q' are employed in Fig. 1a to deflect the bottom run of the transmission elements downward adjacent the pulleys O, O', J and Q and thus provide ample clearance for the latter, and for the adjacent portion of the carrier belt. To guide the last mentioned portion of the carrier belt, there are provided in Fig. 1a a set of upwardly deflecting idler pulleys $la$ mounted on a common shaft $h'$, and a set of downwardly deflecting idler pulleys $lb$ also mounted on a common shaft $h'$. Except for their greater diameters and for the necessity of providing for greater bearing pressures, each set of pulleys J, P, Q and QA may be similar in form and arrangement to the main idler pulley $h$. The deflecting pulleys $la'$ and $lb$ may be similar in construction and mounting to the idler pulleys $l$ previously described.

The tripper or discharging device C shown in Fig. 1 comprises a framework in which are journalled upper and lower pulleys $C^2$ and $C^3$, respectively, which may be generally similar to the head and tail pulleys D and E. The purpose of the pulley $C^2$ is to upwardly incline the adjacent portion of the carrier belt approaching it, so that the material on the belt will be elevated above the level of the portion of the carrier belt adjacent and moving away from the pulley $C^3$. The discharge trough C' of the device extending over the last mentioned portion of the carrier belt normally deflects to one or both sides of the latter, the material falling off the carrier belt as it turns about the upper pulley $C^2$. To support the inclined portion of the carrier belt, troughing pulleys LA, which may be like the troughing pulleys L previously described, are employed. When the tripper is adjustable longitudinally of the conveyer as is frequently desirable, the troughing pulleys LA are supported on the frame of the tripper C. To provide for the longitudinal adjustment of the tripper, the frame of the latter is carried by wheels $C^4$ running on track rails $C^5$. When it is desired to discharge the material transported at the head end of the conveyer, this result may be effected by swinging the flapper gate $C^6$ to the position shown in Fig. 1 in which said gate deflects the material into chute $C^7$. In such case the material falling from the carrier belt as it moves over the pulley $C^2$ drops into chute $C^7$ and then onto the portion of the carrier belt moving away from the pulley $C^3$.

Tripper mechanisms similar to the tripper C and operating as above described have been frequently employed with ordinary belt conveyers. The arrangement shown in Fig. 1 is believed to be unique, however, in its location of the tripper frame between the carrier belt and the transmission belt of my improved conveyer apparatus. The form and disposition of the transmission elements F need not be modified in any way to permit the use or non-use of the tripper C. Furthermore, the use or non-use of the tripper does not affect or modify the transmission belt tension required, except to the relatively insignificant extent that the driving force required is slightly increased by the presence of the tripper. A special advantage in the use of a tripper with my improved conveyer results from the relatively low tension of the carrier belt thereof which is required, and the corresponding relative shortness of the sagging section of the carrier belt between the left-hand pulleys LA of Fig. 1 and the adjacent oncoming section of the carrier belt in direct engagement with, and supported by the transmission belt, for the same reasons explained above as permitting a relatively short intermediate section between horizontal and inclined sections of the carrier belt shown in Fig. 1a.

Figure 10:
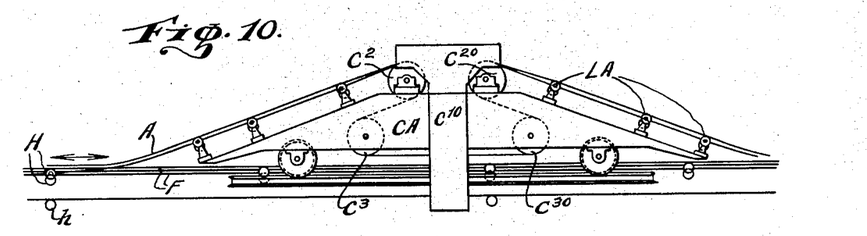
Fig. 10 is a side elevation of a portion of reversible conveyer provided with a reversible or double action tripper.

The location of the tripper mechanism between the carrier belt and the transmission belt makes it possible to drive the carrier and transmission belts in either direction, and with either direction of belt travel, to discharge material at a suitable point along the length of the conveyer by the use of a single double action or reversible tripper, which may conveniently take the form of the tripper CA shown in Fig. 10. The tripper CA differs in form from the tripper C of Fig. 1, essentially only in the provision of a second upper pulley $C^{20}$, like and alongside of pulley $C^2$, in the provision of a second pulley $C^{30}$, like and alongside the pulley $C^3$, and in the provision of additional troughing pulleys LA supporting the inclined portion of the carrier belt shown in Fig. 10 at the right of the pulley $C^{20}$. The discharge trough $C^{10}$ of the tripper CA is disposed between the pulleys $C^2$ and $C^{20}$, above the portion of the carrier belt extending between the pulleys $C^3$ and $C^{30}$. The trough $C^{10}$ is thus in position to receive material from the portion of the carrier belt passing over one or the other of the pulleys $C^2$ and $C^{20}$ accordingly as the travel of the carrier belt A is in one direction or the other. The relatively low carrier belt tension which my invention permits is especially advantageous when a reversible tripper like the tripper CA is used because of the relatively small aggregate length of the portions of the carrier belt necessarily lifted off of the transmission belt by the tripper pulleys. This increases the range of adjustment of the tripper longitudinally of the conveyer. I believe I am the first to provide a belt conveyer of the general type and capacity described which is reversible and has a reversible tripper associated with it.

In handling powdered material such as coal powdered for use in powder coal burning furnaces, or in the production of coke, and in general for handling any material consisting of or including dust, liquid or other material tending to adhere to the carrier belt, it is desirable to clean the load-carrying surface of the belt as it passes away from the head pulley as otherwise the adhering material tends to injure the belt and interfere with the operation when carried between the pulley and the supporting means for the lower run of the carrier belt. To assist in the removal of such adhering material I advantageously employ a rotating brush R, as shown in Figs. 2 and 3, to sweep the load-carrying surface of the carrier belt as it passes between the brush and the head pulley D. Such brushes have been employed with ordinary conveyer belts, and have been driven, as shown in Figs. 2 and 3, by a belt R' running about pulleys carried by the shaft of the brush R and by the shaft D' of the head pulley D, which then forms the driving means for the brush.

In addition to such belt cleaning means of the kind previously employed, I preferably employ special means for cleaning the striplike portions of the carrier belt engaged by the under-run portions of the transmission belt elements F. These special cleaning provisions advantageously comprise nozzles S, one for and discharging a jet of compressed air against each corresponding portion of the belt. Such an air jet is effective not only to remove dust or analogous material, but also to remove moisture from, and dry the strip portion of the belt against which the jet impinges. As shown, the nozzles S are located closely adjacent the brush R and at the side of the latter from which the carrier belt moves, and are supplied with air under pressure through a common supply pipe S' leading from a compressed air reservoir $S^2$. The latter may receive compressed air from any suitable source of supply, but advantageously is supplied with compressed air by a compressor $S^3$ driven through a belt $S^4$ by a driving pulley carried by the shaft D' of the head pulley D.

While the improved troughing characteristics of the carrier belt A insured by the cradle-like supporting action of the transmission belt elements F reduces the spillage tendency, nevertheless, there is some tendency for material to spill from the sides of the carrier belt, particularly at the points at which material is loaded onto the belt. To prevent any such spillage from impinging against and collecting on the upper side of the lower run of the carrier belt, I advantageously provide a deflecting shield or barrier T between the upper and lower runs of the carrier belt. The shield T may advantageously be formed of sheet metal and of inverted trough shape to deflect spillage reaching it to the sides of the conveyer. The shield T may be supported for the major portion of its length, at least, upon the supporting framework for the idler pulleys, generally as shown in Figs. 4 and 5. With said supporting member including an arched member N for each set of upper and lower idler pulleys H and h which extends over the lower belt runs with its crown between the latter and the upper belt runs, as in the preferred construction shown in Figs. 4 and 5, the sections of the shield T extending in opposite directions from each arched member N may advantageously have their adjacent ends supported on said arched members, as shown in said figures. With such a supporting arrangement as many of the sections of the shield T may be readily removed to provide access to the lower run portion of the conveyer for such portion of the length of the latter as may be desirable from time to time, as for the purpose of repairing or adjusting the corresponding lower idler pulleys h. Such a shield may be used with even greater advantage with ordinary conveyer belts where the tendency to spillage is greater than with my apparatus.

As those skilled in the art will understand, use may be made of the present invention in various forms. Thus, for example, I have shown in Figs. 11 and 12, a conveyer in which the upper run of the carrier belt A consists of a single horizontal portion extending between the upper sides of head and tail pulleys D and E, and in which the transmission belt elements F are maintained under suitable tension by connecting the tail pulley $e$ for each belt element F to a corresponding tension weight $E^{20}$ by a cable $e^{21}$ running over a corresponding guide pulley $E^{22}$. The transmission belt driving means shown in Fig. 12 differs from that shown in Fig. 1a in that the driving pulleys J receive the transmission belt elements F from one and deliver it to another of two sets of guide pulleys QB. Each set of pulleys QB may be similar to the set of pulleys Q previously described. As shown, the pulleys J are located beneath, and with their common shaft J' approximately midway between the shafts Q' for the two sets of pulleys QB.

Figure 12:
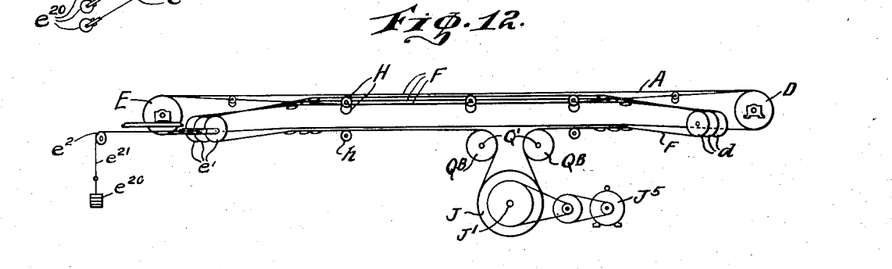
Figure 13:
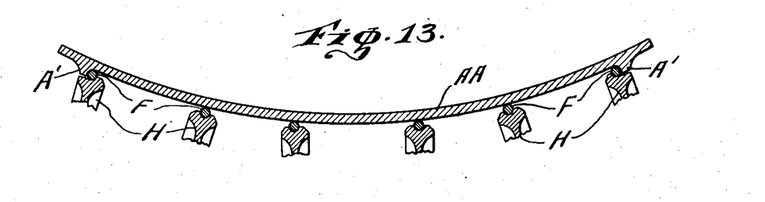
Fig. 13 is a transverse section of the load-carrying portion of conveying apparatus including a carrier belt of special construction.

While in general I consider it unnecessary to provide the carrier belt with special provisions for engagement with the transmission belt elements F to control lateral position of the carrier belt relative to the transmission belt, such provisions may be desirable in some cases. Such provisions may take the form of longitudinal ribs such as the ribs A', as shown in Fig. 12, of the carrier belt AA, which is not engaged by the material. As there shown, the ribs A' are formed adjacent the side edges of the carrier belt in position to bear laterally against the other sides of the portions of the two outer elements F, supporting the upper run of the carrier belt.

In addition to the advantages previously mentioned as obtainable with the present invention, it is to be noted that for the same belt travel speed and material handling capacity, my carrier belt may be narrower than it has been necessary to make an ordinary carrier belt in some cases since the latter is sometimes made wider than its material handling capacity requires, in order that the belt tension per unit of belt width may not be undesirably great.

With the present invention the carrier belt speed may well be considerably higher than is considered good practice with ordinary conveyer belts, with a corresponding increase in material transporting capacity for a belt of the same width. Such higher speed of operation is made possible because of the relatively high tension and small sagging of my transmission belt, and the smoother operation of my apparatus and its avoidance of the continuous succession of impact forces experienced by the ordinary conveyer belt as it passes over the idler pulleys.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent, is:

1. In a belt conveyer, the combination with a carrier belt, of a transmission belt composed of a plurality of side by side narrow belts each having upper and lower run portions respectively underlying and supporting upper and lower run portions of said carrier belt and each having a loop portion connecting the adjacent ends of its upper and lower run portions, and a separate set of guide pulleys for each narrow belt including a pulley at the side of the carrier belt about which said loop portion extends, and two pulleys one above and the other beneath the lower run of the carrier belt and each engaging said narrow belt at the junction of its said loop portion with the adjacent run portion thereof.

2. In a belt conveyer, the combination with a carrier belt and head and tail pulleys about which said belt extends at its ends, of a transmission belt comprising a plurality of side by side narrow belts having upper and lower run portions respectively underlying and supporting upper and lower run portions of said carrier belt and guide and supporting pulleys for said narrow belts including end pulleys laterally displaced from, and intermediate pulleys underlying said run portions of said carrier belt.

3. In a belt conveyer, the combination with a carrier belt travelling along a path including two sections at different inclinations to the horizontal and an intermediate curved section, of a transmission belt comprising a plurality of side by side narrow belts including portions underlying said two path sections and supporting the corresponding portions of said carrier belt, and guide pulley means for said narrow belts including two pulleys for each narrow belt adjacent said intermediate section about which the said narrow belt is looped and by which it is deflected away from said intermediate section.

4. In a belt conveyer, the combination with a carrier belt travelling along a path including two sections at different inclinations to the horizontal and an intermediate curved section, of a transmission belt comprising a plurality of side by side narrow belts including portions underlying said two sections and supporting the corresponding portions of said carrier belt, and guide pulleys for said narrow belts including two guide pulleys, one at each side of the line of intersection of said two sections for each narrow belt and about both of which the latter is looped.

5. In a belt conveyer, the combination with a carrier belt of a transmission belt comprising a plurality of spaced apart narrow belts each having upper and lower run portions underlying and supporting upper and lower run portions of the carrier belt and each having its end portions laterally displaced from the corresponding end portions of the main belt, and tension regulating provisions engaging under run portions of the transmission belt and located beneath said carrier belt.

6. In a belt conveyer, the combination with a carrier belt of a transmission belt comprising a plurality of spaced apart narrow belts each having upper and lower run portions underlying and supporting upper and lower run portions of the carrier belt and each having its end portions laterally displaced from the corresponding end portions of the main belt, and driving provisions engaging under run portions of the transmission belt and located beneath said carrier belt.

7. In a belt conveyer, the combination with a carrier belt, head and tail pulleys about which said belt extends and means for adjusting one of said pulleys relative to the other to regulate the tautness of said belt, of a transmission belt comprising a plurality of spaced apart narrow belts each having upper and lower run portions underlying and supporting upper and lower run portions of the carrier belt and each having its end portions laterally displaced from the corresponding end portions of the carrier belt, and tension regulating provisions engaging under run portions of the transmission belt.

8. In a belt conveyer, the combination with a carrier belt, of a separate transmission belt underlying and giving movement to the load carrying run portion of the carrier belt, of a tripper comprising a tripper frame interposed between said belts and pulleys carried by said frame and about which said carrier belt is passed and by which the adjacent portions of the latter are lifted away from the portion of the transmission belt beneath the said frame.

9. In a belt conveyer, the combination with a reversible carrier belt, of a separate reversible transmission belt supporting and giving movement to the loaded portion of the carrier belt, a tripper frame located between said belts and idler pulleys on the tripper frame about which said carrier belt is looped and by which portions of the carrier belt at opposite sides of said pulleys are inclined upwardly away from the transmission belt into engagement with said pulleys.

10. In a belt conveyer, the combination with a carrier belt having approximately straight upper and lower run portions and bent connecting portions, of means for driving said carrier belt and supporting said approximately straight portions thereof comprising a plurality of narrow transmission belts having upper and lower run portions respectively beneath and in frictional engagement with said aproximately straight upper and lower run portions of the carrier belt and each including two loop portions connecting adjacent upper and lower run portions thereof and extending laterally to one side of said carrier belt, and pulleys for guiding and giving motion to said transmission belts including a separate pulley at one side of the carrier belt for each of said transmission belt loop portions and about each of which the corresponding loop portion is looped.

11. In a belt conveyer, the combination with a carrier belt having approximately straight upper and lower run portions and bent connecting portions, of means for driving said carrier belt and supporting said approximately straight portions thereof comprising a plurality of narrow transmission belts having upper and lower run portions respectively beneath and in frictional engagement with said approximately straight upper and lower run portions of the carrier belt and each including two loop portions connecting adjacent upper and lower run portions thereof and extending laterally to one side of said carrier belt, and pulleys for guiding and giving motion to said transmission belts including a separate pulley at one side of the carrier belt for each of said transmission belt loop portions and about each of which the corresponding loop portions is looped, the last mentioned pulleys each turning about an axis obliquely inclined to the length of the conveyer.

12. In a belt conveyer, the combination with a carrier belt and head and tail pulleys about which said belt extends at its ends, of a transmission belt comprising a plurality of side by side narrow belts having upper and lower run portions respectively underlying and supporting upper and lower run portions of said carrier belt and a separate set of guide and supporting pulleys for each of said narrow belts including end pulleys laterally displaced from, and intermediate pulleys underlying said run portions of said carrier belt.

13. In a belt conveyer, the combination with a carrier belt, of idler pulleys at the ends of the conveyer about which said carrier belt is looped, and means for driving said carrier belt comprising a plurality of narrow transmission belts having upper and lower run portions respectively underlying and in frictional engagement with upper and lower run portions of said carrier belt, and means for guiding and giving motion to said transmission belts including an individual set of guide pulleys for each narrow belt each set including pulleys underlying said upper and lower run portions of the carrier belt and maintaining the corresponding underlying portions of the transmission belts in fixed displacement from one another laterally of the carrier belt, and pulleys laterally displaced from the carrier belt about which extend loop portions of the corresponding transmission belt connecting adjacent upper and lower run portions of the last mentioned belt.

14. In a belt conveyer, the combination with a carrier belt, of idler pulleys at the ends of the conveyer about which said carrier belt is looped, and means for driving said carrier belt comprising a plurality of narrow transmission belts each having upper and lower run portions respectively underlying and in frictional engagement with upper and lower run portions of said carrier belt, and means for guiding and giving motion to said transmission belts including an individual set of guide pulleys for each narrow belt displacing said upper and lower run portions of the different narrow belts and thereby causing them to engage different longitudinal portions of the carrier belt.

15. In a belt conveyer, a carrier belt, and means for supporting and driving superposed upper and lower run portions of said carrier belt comprising a plurality of narrow transmission belts each of which has upper and lower run portions respectively underlying the said upper and lower run portions of the carrier belt and a loop portion which connects one end of its said upper run portion to the corresponding end of its said lower run portion and which extends laterally away from the carrier belt at one side of the latter, a separate end pulley for each transmission belt about which said loop portion extends, an upper deflecting pulley for each transmission belt at the junction of its upper run portion with the loop portion thereof, and a lower deflecting pulley for each transmission belt at the junction of the end of its lower run portion with the loop portion thereof, the said ends of the upper and lower run portions of each transmission belt being spaced apart by a distance greater than the diameter of the corresponding end pulley and the axes of the two corresponding deflecting pulleys being inclined to one another so that the corresponding run and loop portions of each transmission belt extend approximately tangentially away from each of the corresponding deflection pulleys.

16. In a belt conveyer, a carrier belt, and means for supporting and driving superposed upper and lower run portions of said carrier belt comprising a plurality of narrow transmission belts each of which has upper and lower run portions respectively underlying the said upper and lower run portions of the carrier belt, and a connecting loop portion at each of its ends laterally displaced from the lower run portion of the carrier belt, and a separate set of guide pulleys for each end of each transmission belt including a pulley laterally displaced from the carrier belt about which the corresponding loop portion of the transmission belt extends, and an upper pulley and a lower pulley respectively underlying the upper and lower run portions of the carrier belt, each of the two last mentioned pulleys being displaced laterally of the carrier belt from the corresponding guide pulleys for the adjacent transmission belts whereby the said transmission belts have their upper and lower runs distributed laterally of the carrier belt.

17. In a belt conveyer, a carrier belt, and idler pulley at one end of the conveyer about which said carrier belt is looped, and means for supporting and driving the upper and lower run portions of said carrier belt adjacent said idler, comprising a plurality of narrow transmission belts each having upper and lower run portions respectively underlying the said upper and lower run portions of the carrier belt, and a connecting loop portion adjacent the said end of the conveyer and extending to one side of the carrier belt, and means for supporting and guiding said transmission belts including guide pulleys underlying the upper run portion and guide pulleys underlying the lower run portion of the carrier belt, and guide pulleys adjacent said end of the conveyer about which the said loop portions of said transmission belts extend.

ELMER J. CROSSEN.